US007280966B2

(12) United States Patent
Ju et al.

(10) Patent No.: US 7,280,966 B2
(45) Date of Patent: *Oct. 9, 2007

(54) ELECTRONIC MAIL REPLIES WITH SPEECH RECOGNITION

(75) Inventors: Yun-cheng Ju, Bellevue, WA (US); Peter K. L. Mau, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,901

(22) Filed: May 11, 2006

(65) Prior Publication Data

US 2006/0195541 A1   Aug. 31, 2006

Related U.S. Application Data

(63) Continuation of application No. 10/159,435, filed on May 29, 2002.

(51) Int. Cl.
*G10L 15/00* (2006.01)
*G10L 15/18* (2006.01)

(52) U.S. Cl. .................. 704/257; 704/9; 704/235; 704/255; 704/270.1; 704/260

(58) Field of Classification Search ............... 704/260, 704/257, 255, 235, 270.1, 9
See application file for complete search history.

(56) References Cited

U.S. PATENT DOCUMENTS

| | | | |
|---|---|---|---|
| 4,837,798 A | 6/1989 | Cohen et al. | |
| 5,970,449 A | 10/1999 | Alleva et al. | |
| 6,014,429 A * | 1/2000 | LaPorta et al. | 379/88.15 |
| 6,246,981 B1 | 6/2001 | Papineni et al. | |
| 6,308,151 B1 | 10/2001 | Smith | |
| 6,442,250 B1 * | 8/2002 | Troen-Krasnow et al. | 379/93.15 |
| 6,650,903 B2 * | 11/2003 | Inselberg | 455/517 |
| 6,775,264 B1 | 8/2004 | Kurganov | |
| 6,801,604 B2 | 10/2004 | Maes et al. | |
| 6,807,254 B1 | 10/2004 | Guedalia et al. | |
| 6,895,257 B2 | 5/2005 | Boman et al. | |
| 6,901,364 B2 | 5/2005 | Nguyen et al. | |
| 6,999,565 B1 * | 2/2006 | Delaney et al. | 379/88.13 |

(Continued)

FOREIGN PATENT DOCUMENTS

EP   1239385 A1   9/2002

(Continued)

OTHER PUBLICATIONS

European Search Report, 3 pages, Sep. 25, 2006.

*Primary Examiner*—David Hudspeth
*Assistant Examiner*—Eunice Ng
(74) *Attorney, Agent, or Firm*—Todd R. Fronek; Westman, Champlin & Kelly, P.A.

(57) ABSTRACT

A method for responding to an electronic mail message with a limited input device such as a phone includes audibly rendering the question and a set of proposed answers typically provided in the electronic mail message by the sender of the electronic mail message. A language model indicative of the proposed answers is provided to a speech recognizer. The response from the user is obtained and converted to a textual response using the speech recognizer and language model. A second electronic e-mail message is then sent back to the sender. The second electronic mail message includes the textual response.

20 Claims, 3 Drawing Sheets

U.S. PATENT DOCUMENTS

2002/0099777 A1* 7/2002 Gupta et al. ................ 709/206
2003/0200137 A1* 10/2003 Drummond .................. 705/12

FOREIGN PATENT DOCUMENTS

| JP | 2001/306462 | 4/2000 |
| WO | 01/74041 A2 | 10/2001 |
| WO | 01/86970 A2 | 11/2001 |
| WO | 03/058991 A2 | 7/2003 |

* cited by examiner

ELECTRONIC MAIL REPLIES WITH SPEECH RECOGNITION

CROSS REFERENCE TO RELATED APPLICATION

This application is a continuation of U.S. patent application Ser. No. 10/159,435, filed on May 29, 2002, the contents of which are hereby incorporated by reference in its entirety.

BACKGROUND OF THE INVENTION

The present invention relates to electronic mail (e-mail). More particularly, the present invention relates to combining speech recognition with electronic mail.

Electronic mail is being used with every increasing frequency for people to communicate both for business and personal reasons. Typically, messages are conveyed to and from an e-mail recipient in a textual format wherein the sender composes a text message. If the recipient chooses to reply, he or she composes another text message in response.

With the increased use e-mails for communication, there has been a desire to extend access to situations where the user does not have the availability of a computer. In particular, applications have been developed to allow a user to access his or her e-mail through a phone. Using text-to-speech technology, these types of systems will read a selected e-mail message to the user.

Although reading e-mail messages over the phone provides increases accessibility for the user to his or her e-mail, in many cases the recipient may want to reply in some manner. However, general dictation over the phone and subsequent speech-to-text recognition over phone lines is not practical. In particular, the bandwidth available for phone lines, the quality of the phone and the environment that the user may be in makes it extremely difficult to detect the subtleties of general dictation over the phone. Nevertheless, there is still exists a need in many cases for a recipient to reply to an e-mail message over the phone.

SUMMARY OF THE INVENTION

A method for responding to an electronic mail message with a limited input device such as a phone includes audibly rendering the question and a set of proposed answers typically provided in the electronic mail message by the sender of the electronic mail message. A language model indicative of the proposed answers is provided to a speech recognizer. The response from the user is obtained and converted to a textual response using the speech recognizer and language model. A second electronic e-mail message is then sent back to the sender. The second electronic mail message includes the textual response.

Using this method or system, which can be embodied on a computer readable media, the user or intended recipient can provide meaningful responses back to the sender even though the response is generated based on speech from a phone. Although speech recognition of general dictation from a phone is typically poor for the reasons discussed above, a defined or finite language model based upon the proposed answers to the question provides accurate speech recognition results. In one embodiment, the language model is a context-free grammar. The context free grammar can be generated for use by the speech recognizer when the user selects the electronic mail message to render. Indicators such as XML (extended markup language) tags can be used to denote which portions of the electronic mail message pertain to the question, and which portion pertains the proposed answers. In view of structured format of the electronic mail message, responses can be associated with each question in the subsequent reply mail message.

Components or modules of the present invention can reside on a server used to store electronic mail messages for one or more recipients. In yet a further embodiment, processing can be performed by a remote computer connected to the electronic mail message server. For instance, upon selection of an electronic mail message to render, the electronic mail message server can forward the electronic mail message for conversion to a signal suitable for audible rendering, the signal then being played to the user. Likewise, the audible response from the user can be forwarded to a remote speech recognizer, which in turn, provides a textual response corresponding to the user's utterance. The language model generator can also reside on the remote computer to generate the appropriate language model based on the proposed answers of the electronic mail message.

DETAILED DESCRIPTION OF ILLUSTRATIVE EMBODIMENT

Figure 1:
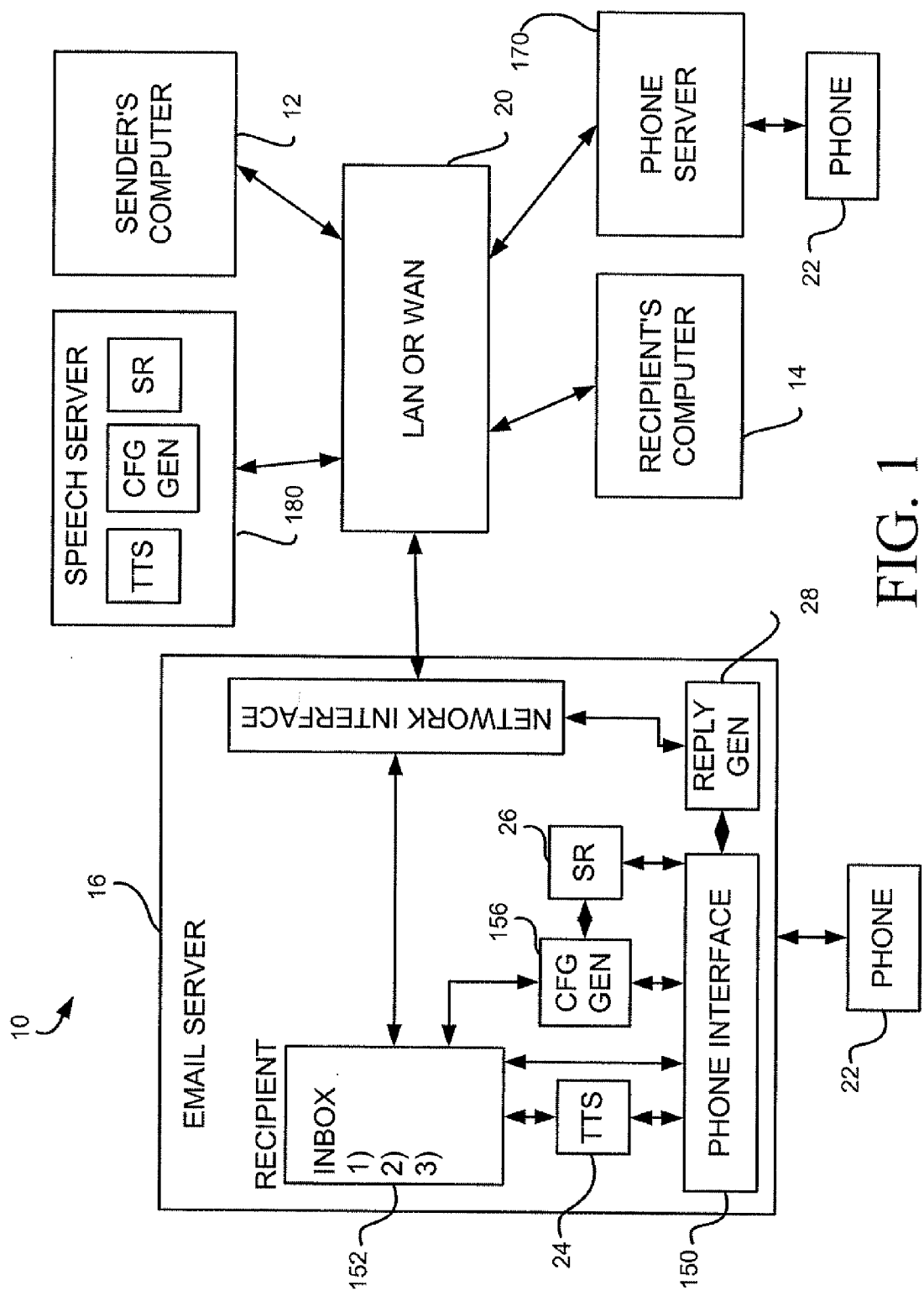
FIG. 1 is a schematic block diagram of an exemplary operating environment.

FIG. 1 is a block diagram of a network 10 for sending and responding to e-mail communications. Network is an exemplary operating environment for the present invention and includes a sender's computer 12, a recipient's computer 14 and an e-mail server 16 all connected together to communicate with each other through a local area network (LAN) or wide area network (WAN) 20. Generally, the sender's computer 12 originates an e-mail communication intended for a selected recipient that is sent to the recipient through the network 20 and is actually stored on the e-mail server 16. Computer 14 represents a device that allows the recipient to selectively obtain his/her e-mail messages from the e-mail server 16. Computer 14 represents a device typically having a visual display and input device such as a keyboard that allows the recipient to read and respond to e-mail messages in a visual manner. However, as one aspect of the present invention, the recipient can also use a phone (payphone, wired, wireless, cellular, etc.) to access his/her e-mail messages, herein by way of example, with connection to the e-mail server 16. As discussed more further below, a text-to-speech module 24 can provide an audio signal corresponding to a selected e-mail message. However, if the e-mail message further includes a question and possible answers formulated by the sender, the question and possible answers can be audibly rendered. A speech recognizer 26 can then be utilized to obtain an response from the recipient; formulate a text message in accordance with the response by a reply generator 28; and send the response back to the sender. In this manner, the recipient can immediately respond to the sender's e-mail message, providing information to the sender which is useful without the recipient needing to locate a computer or other device to formulate the desired response.

Prior to a further detailed discussion of the present invention, an overview of a suitable computing system environment 50 may be helpful. The computing system environment 50 can be used to implement the present invention and can be used for any of the computers of FIG. 1. However, the computing system environment 50 is only one example of a suitable computing environment and is not intended to suggest any limitation as to the scope of use or functionality of the invention. Neither should the computing environment 50 be interpreted as having any dependency or requirement relating to any one or combination of components illustrated in the exemplary operating environment 50.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

Figure 2:
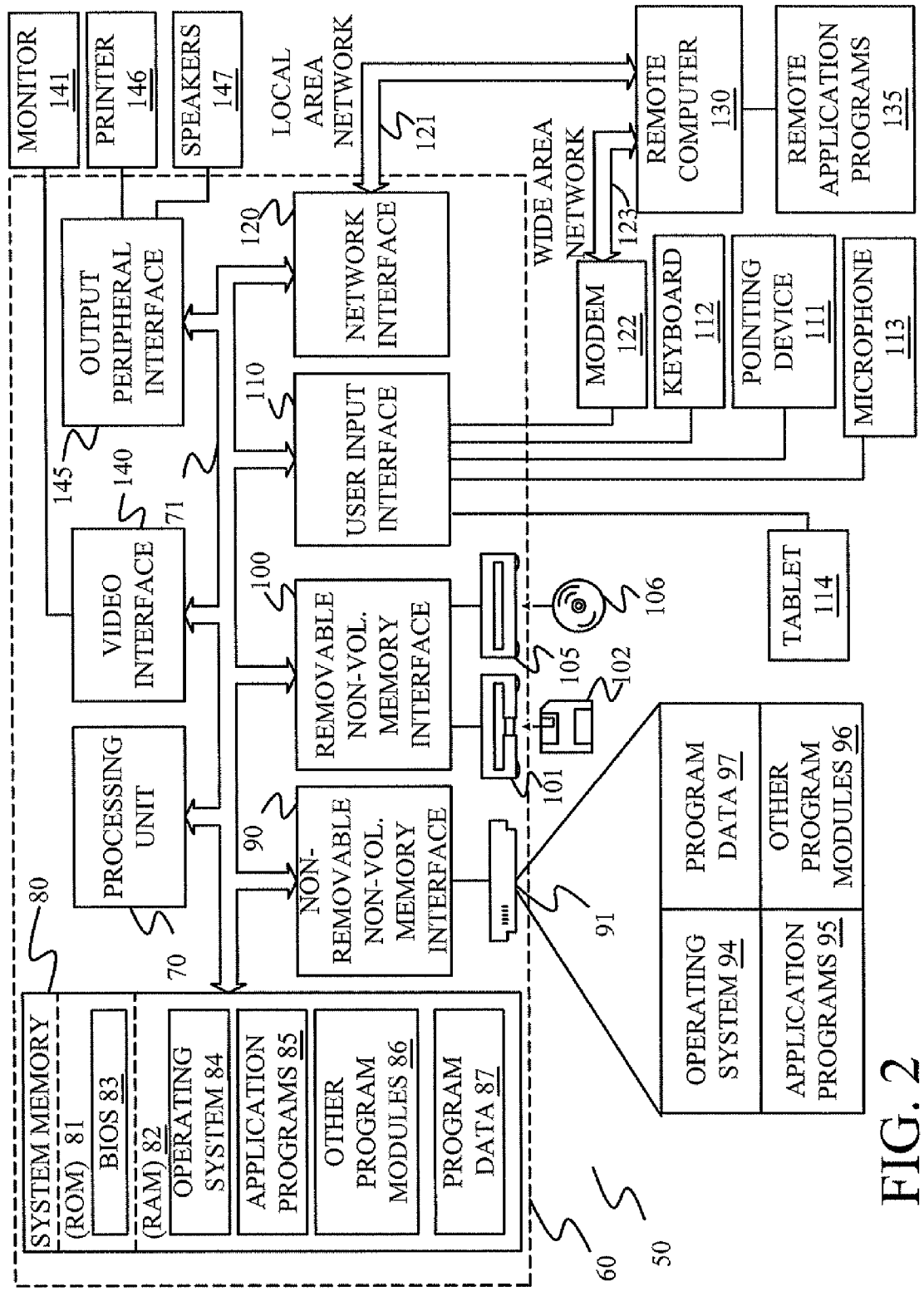
FIG. 2 is a block diagram of a general purpose computer.

With reference to FIG. 2, an exemplary system for implementing the invention includes a general-purpose computing device in the form of a computer 60. Components of computer 60 may include, but are not limited to, a processing unit 70, a system memory 80, and a system bus 71 that couples various system components including the system memory to the processing unit 70. The system bus 71 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 60 typically includes a variety of computer readable media. Computer readable media can be any available media that can be accessed by computer 60 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 60.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 80 includes computer storage media in the form of volatile and/or nonvolatile memory such as read only memory (ROM) 81 and random access memory (RAM) 82. A basic input/output system 83 (BIOS), containing the basic routines that help to transfer information between elements within computer 60, such as during start-up, is typically stored in ROM 81. RAM 82 typically contains data and/or program modules that are immediately accessible to and/or presently being operated on by processing unit 70. By way of example, and not limitation, FIG. 2 illustrates operating system 84, application programs 85, other program modules 86, and program data 87.

The computer 60 may also include other removable/non-removable volatile/nonvolatile computer storage media. By way of example only, FIG. 2 illustrates a hard disk drive 91 that reads from or writes to non-removable, nonvolatile magnetic media, a magnetic disk drive 101 that reads from or writes to a removable, nonvolatile magnetic disk 102, and an optical disk drive 105 that reads from or writes to a removable, nonvolatile optical disk 106 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 91 is typically connected to the system bus 71 through a non-removable memory interface such as interface 90, and magnetic disk drive 101 and optical disk drive 105 are typically connected to the system bus 71 by a removable memory interface, such as interface 100.

The drives and their associated computer storage media discussed above and illustrated in FIG. 2, provide storage of computer readable instructions, data structures, program modules and other data for the computer 60. In FIG. 2, for example, hard disk drive 91 is illustrated as storing operating system 94, application programs 95, other program modules 96, and program data 97. Note that these components can either be the same as or different from operating system 84, application programs 85, other program modules 86, and program data 87. Operating system 84, application programs 85, other program modules 86, and program data 87 are given different numbers here to illustrate that, at a minimum, they are different copies.

A user may enter commands and information into the computer 60 through input devices such as a keyboard 112, a microphone 113, a handwriting tablet 114, and a pointing device 111, such as a mouse, trackball or touch pad. Other input devices (not shown) may include a joystick, game pad, satellite dish, scanner, or the like. These and other input devices are often connected to the processing unit 70 through a user input interface 110 that is coupled to the system bus, but may be connected by other interface and bus structures, such as a parallel port, game port or a universal serial bus (USB) A monitor 141 or other type of display device is also connected to the system bus 71 via an interface, such as a video interface 140. In addition to the monitor, computers may also include other peripheral output devices such as speakers 147 and printer 146, which may be connected through an output peripheral interface 145.

The computer 60 may operate in a networked environment using logical connections to one or more remote computers, such as a remote computer 130. The remote computer 130 may be a personal computer, a hand-held device, a server, a router, a network PC, a peer device or other common network node, and typically includes many or all of the elements described above relative to the computer 60. The logical connections depicted in FIG. 2 include a local area network (LAN) 121 and a wide area network (WAN) 123, but may also include other networks. Such networking environments are commonplace in offices, enterprise-wide computer networks, intranets and the Internet.

When used in a LAN networking environment, the computer 60 is connected to the LAN 121 through a network interface or adapter 120. When used in a WAN networking environment, the computer 60 typically includes a modem 122 or other means for establishing communications over the WAN 123, such as the Internet. The modem 122, which may be internal or external, may be connected to the system bus 71 via the user input interface 110, or other appropriate mechanism. In a networked environment, program modules depicted relative to the computer 60, or portions thereof, may be stored in the remote memory storage device. By way of exampler and not limitation, FIG. 2 illustrates remote application programs 135 as residing on remote computer 130. It will be appreciated that the network connections shown are exemplary and other means of establishing a communications link between the computers may be used.

In the exemplary embodiment of FIG. 1, an e-mail message or communication originates as input provided through the sender's computer 12. The e-mail message comprises a question or other statement having responses thereto, and proposed answers or responses that the recipient can make with respect to the question.

The text of the question and the text of the answers can include indicators denoting their respective parts so as to aid in interpretation when processed for the recipient. Below is an exemplary message having a question and possible answers wherein the indicators comprise XML (extended mark-up language) tags. Other forms of indicators can also be used.

```
<QASession>
    <Question> Are you able to come home
for dinner? </Question>
    <Answer>
        <Option Yes/>
        <Option No />
        <Option Maybe />
    </Answer>
</QASession>
```

In the example above, the tags "<Questions>" "<Answers>" denote the corresponding question portion and answer portion of the e-mail message. It should also be noted that the question and proposed answers can be grouped or organized in sets so as to allow multiple question and answer segments in the message. In the example above, the question and reposed answers are organized based on the "<QASession>" tags.

An authoring tool may be used by the sender at the sender's computer 12 to solicit the questions and the proposed answers from the sender, and then substantially generate the e-mail message with indicators. It should also be noted that some proposed answers may be stored and accessed without the sender having to individually generate the proposed answers. Some examples include proposed answers of the form "yes/no/notsure", times of the day, days of the week, etc.

The e-mail message with the question and proposed answers structure is sent through the network 20 to the recipient's e-mail address herein provided at e-mail server 16. The question and proposed answer e-mail message can be included with other text, attachments, embedded pictures, etc.

Figure 3:
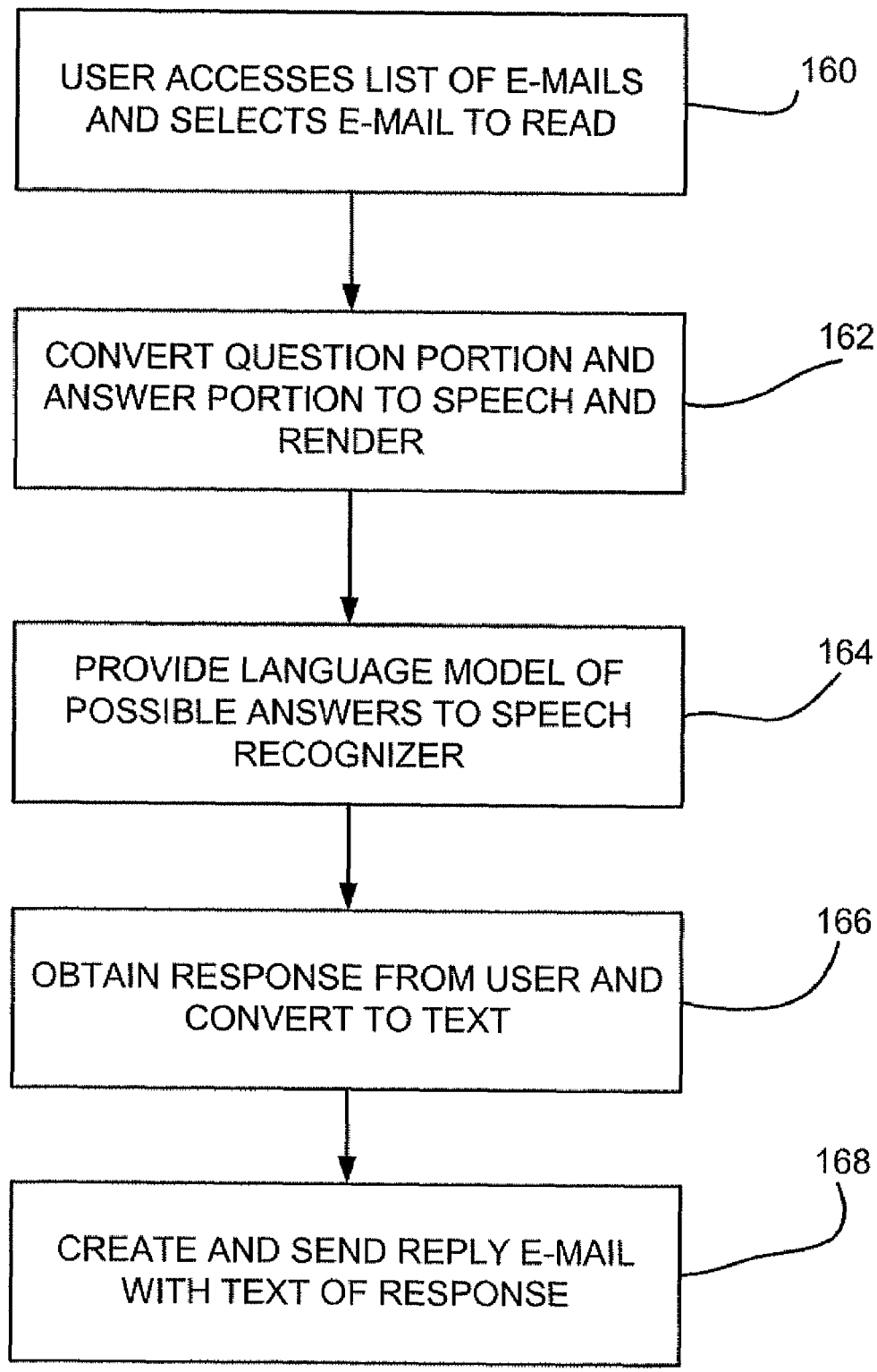
FIG. 3 is a flow diagram of an exemplary method for reading and responding to an e-mail.

As indicated above and with reference to FIG. 3, the recipient can access his or her e-mail messages with the phone 22 rather than a computer such as indicated at 14. The e-mail server 16 includes components or modules for processing the question and proposed answer e-mail message discussed above, including obtaining and generating a reply based on the proposed answers. The phone 22 connects through a phone network to a phone interface 150, which in the block diagram illustrated generally serves a controller module as well. The interface 150 allows the user to access his/her e-mail storage indicated at 152 and select which e-mail to render at step 160 in FIG. 3. Generally, the text portion of the e-mail message is interpreted by the text-to-speech converter 24 to generate an audio signal that is sent through the phone network to the phone 22.

If, however, indicators are present in the e-mail message indicating that the e-mail message is of the form of a question and proposed answers, in addition to converting the portions to speech at step 162, a language model indicative of the proposed answers is provided to the speech recognition module 26 at step 164. (It should be noted steps 162 and 164 can be interchanged.) The language model can take any number of known forms such as a context-free grammar, N-gram, hybrid (context-free grammar and N-gram), or the like. A language model in the form a context-free grammar is particularly advantageous since it is compact and can be obtained directly from the proposed answers. In the embodiment illustrated, a context-free grammar generator module 156 accesses the e-mail message currently being rendered to obtain the proposed answers and provide them to the speech recognition module 26, commonly in the form of a lattice or other suitable structure. Since the language module of the proposed answers can be small, it should be noted that the language model could originate at the sender's computer 12 and be transmitted with the message. In such cases, the CFG generator module 156 or the like can be located at the sender's computer 12. However, by locating the CFG generator module 156 or language model generator at the e-mail server 16 or other server remote from the sender computer 12, e-mail messages can be of generic form such as the XML format described above, allowing the CFG generator module 156 and the speech recognition module 26 to be updated easily.

After the text-to-speech module 24 processes the text of the question so as to generate a corresponding audio signal, the e-mail server 16 can optionally remind the recipient that it is now possible to respond to the question, for example, with a pre-recorded prompt like "Do you want to record your response?." Using the speech recognition module 26, if the recipient responds to this prompt in the affirmative, the text-to-speech module 24 can then render some or all of the possible answers present in the e-mail message. The speech recognition module 26 is then used at step 166 to record the recipient's response and obtain a corresponding textual equivalent thereof. Since the language model, for example, CFG model, is limited to a few possible answers, accurate recognition is possible even through the utterance has been transmitted through the phone 22 and associated phone network. However, if necessary, the question and/or possible answers can be repeated if the response is unrecognized or based upon the recipient's initiative.

The textual equivalent of the answer provided by the recipient is provided back to the sender, and more particularly, to the sender's e-mail address at step 168. The reply generator 28 can be used to structure the answer in a form more convenient for further processing. In the example provided below, indicators (XML tags) are used to denote the question as well as the corresponding answer selected by the recipient.

```
<Reply>
    <Question> Are you able to come home
for dinner? </Question>
    <Answer Yes/>
</Reply>
```

"<Reply>" tags can be used in a similar manner to the "<QASession>" tags to group questions with selected answers such that in a multiple question reply, the corresponding answer can be easily ascertained. This format allows the answers to be rendered in a manner closely associated with the question. For example, if the reply e-mail message is visually rendered, the answer can be positioned below the question or proximate thereto. Likewise, if the sender accesses his or he e-mail also through the phone 22, the reply e-mail message can be rendered easily in a manner favorable to understanding since the questions and answers can be rendered sequentially.

It should be noted that if the response to the question was unrecognized, or was not given by the recipient, the reply generator 28 can include this information as well.

User of indicators for the question and the reply from the recipient also allows further processing to be performed. For instance, if the sender broadcasts or sends the same or similar e-mail message to a number of recipients, besides the sender ascertaining how each recipient responded to a particular question, processing can be performed by the sender's e-mail application to provide summary information. For example, the summary information can include which and how many recipients have responded and how many responded with a selected answer. Once again, this can be helpful when the sender accesses his or her e-mail through phone 22.

Although illustrated in FIG. 1 where phone access is provided through the e-mail server 16, it should be understood that this is but one exemplary embodiment in that access to e-mails through a phone can be provided through other computers connected or connectable to the network 20. For instance, a dedicated phone server can be provided at 170 if desired. Alternatively, phone access can be provided through computers 12 or 14.

In a similar fashion, text-to-speech conversion and speech recognition need not be integrated in the e-mail server 16. For instance, a dedicated speech server 180 can be connected to the network 20 to receive information indicative of text, audio signals, and/or language models, etc. in order to process the question and propose answers in the e-mails messages, and/or the responses made by the recipient, the latter of which can be returned back to the e-mail server 16 or other computer requesting that this information be processed.

Although the present invention has been described with reference to particular embodiments, workers skilled in the art will recognize that changes may be made in form and detail without departing from the spirit and scope of the invention.

What is claimed is:

1. A computer-implemented method, comprising:
accessing a first electronic mail message with a question portion indicative of a question and a proposed answer portion having proposed answers to the question;
converting the question portion and the proposed answer portion to speech;
broadcasting the first electronic mail message to a plurality of recipients;
audibly rendering the question and each of the proposed answers to the plurality of recipients;
generating a context free grammar as a function of the proposed answer portion and providing the context free grammar to a speech recognizer;
receiving a response from at least some of the plurality of recipients and converting each response to a textual response using the speech recognizer and the context free grammar; and
rendering information indicative of each textual response and how many of the plurality of recipients provided a response.

2. The computer-implemented method of claim 1 and further comprising ascertaining which of the proposed answers each of the plurality of recipients that provided a response selected and rendering information indicative thereof.

3. The computer-implemented method of claim 1 and further comprising indicating a number of responses received for each of the proposed answers.

4. The computer-implemented method of claim 3 wherein the step of generating the context free grammar follows the step of accessing the first electronic mail message.

5. The computer-implemented method of claim 2 wherein indicators denote the question portion and the proposed answer portion.

6. The computer-implemented method of claim 5 wherein indicators comprise tags indicating a beginning and an end of the question portion and a beginning and an end of the proposed answer portion.

7. The computer-implemented method of claim 6 wherein the tags associate the question portion with the proposed answer portion.

8. The computer-implemented method of claim 7 wherein indicators denote the portion indicative of the question and the textual response.

9. The computer-implemented method of claim 8 wherein indicators comprise tags indicating a beginning and an end of the portion indicative of the question and the textual response.

10. The computer-implemented method of claim 1 wherein the first electronic mail message includes a plurality of question portions indicative of a plurality of questions and a plurality of proposed answer portions having a plurality of proposed answers to the questions.

11. A computer readable media including instructions readable by a computer which, when implemented, cause the computer to handle information by performing steps comprising:
- receiving information related to an electronic mail message having a question portion indicative of a question and a proposed answer portion with proposed answers to the question;
- converting the question portion and the answer portion to a signal suitable for rendering audibly;
- sending the signal to a plurality of recipients;
- generating a context free grammar as a function of the proposed answer portion;
- receiving information indicative of responses from at least some of the plurality of recipients;
- converting the responses to text as a function of the context free grammar; and
- analyzing the responses to determine a number of the responses that correspond to each of the proposed answers.

12. The computer readable media of claim 11 wherein the steps further include ascertaining which of the proposed answers each of the plurality of recipients that provided a response selected and rendering information indicative thereof.

13. The computer readable media of claim 11 wherein the steps further include providing summary information indicative of analyzing the responses.

14. The computer readable media of claim 11 and further comprising determining how many of the plurality of recipients provided a response.

15. The computer readable media of claim 11 wherein the information related to an electronic mail message includes a plurality of question portions indicative of a plurality of questions and a plurality of proposed answer portions indicative of proposed answers to the questions.

16. A computer-implemented method, comprising:
- accessing a first electronic mail message with a plurality of question portions indicative of a plurality of questions and a plurality of proposed answer portions having a plurality of proposed answers to the plurality of questions;
- converting each of the plurality of question portions and each of the plurality of proposed answer portions to speech;
- audibly rendering each of the plurality of questions and each of the plurality of proposed answers to a user;
- generating a context free grammar as a function of each of the plurality of the proposed answer portions and providing each context free grammar to a speech recognizer;
- receiving a plurality of responses from the user and converting each response to a textual response using the speech recognizer and each context free grammar; and
- sending a second electronic mail message to a sender of the first electronic mail message, the second electronic mail message including each textual response.

17. The computer-implemented method of claim 16 and further comprising rendering each textual response proximate its associated question.

18. The computer-implemented method of claim 16 and further comprising: associating each of the plurality of responses with one of the proposed answers.

19. The computer-implemented method of claim 16 and further comprising:
- broadcasting the first electronic mail message to a plurality of recipients; and
- receiving a plurality of responses from at least some of the plurality of recipients.

20. The computer-implemented method of claim 19 and further comprising:
- analyzing the plurality of responses from the at least some of the plurality of recipients to determine a number of responses associated with each of the plurality of proposed answers and how many of the plurality of recipients provided responses.

* * * * *